J. H. MERRILL.
Breech-Loading Fire-Arm.
No. { 53, / 1,158. }
Reissued Mar. 26, 1861.
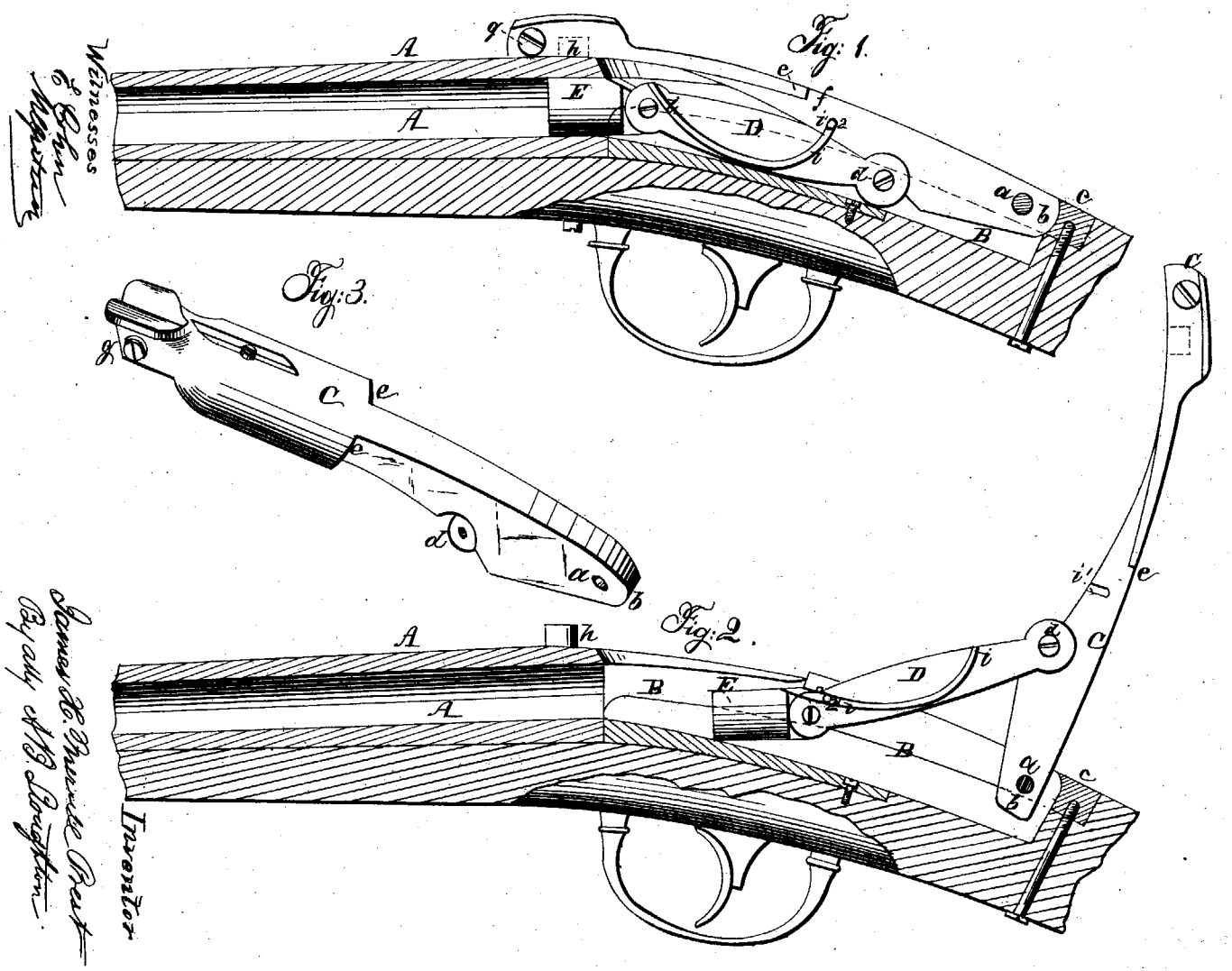
N. PETERS, PHOTO-LITHOGRAPHER, WASHINGTON, D. C.

UNITED STATES PATENT OFFICE.

THE MERRILL PATENT FIRE ARM MANUFACTURING COMPANY, OF BALTIMORE, MARYLAND, ASSIGNEE OF JAMES H. MERRILL.

IMPROVEMENT IN FIRE-ARMS.

Specification forming part of Letters Patent No. 20,954, dated July 20, 1858; Reissue No. 1,158, dated May 26, 1861.

DIVISION C.

*To all whom it may concern:*

Be it known that JAMES H. MERRILL, of the city of Baltimore and State of Maryland, did invent certain new and useful Improvements in Breech-Loading Fire-Arms; and the following is a full, clear, and exact description of said MERRILL'S invention, reference being had to the accompanying drawings, making a part of this specification, in which—

Figures 1 and 2 represent longitudinal vertical sections through portions of the gun, showing the breech as closed and as open, and the relative position of the parts to each other when open and when closed. Fig. 3 represents a perspective view of the lever by which the breech pin or plug is operated.

It is necessary that the plug or breech-pin of a breech-loading gun should snugly fit the bore of the barrel and fairly enter it, else it will become bruised or chafed or bruise or chafe the barrel; and as the plug or breech-pin must move some distance from the end of the barrel, so as to afford sufficient space to drop or enter the cartridge, and out of the line of the bore, so that a swab or cleaning-stick may be inserted to clean out the bore of the gun, it is important that its movements be controlled, and thus not be subject to cramping or binding, or of cutting, bruising, or chafing itself or the bore of the gun. To accomplish these objects is the purpose of this part of said MERRILL'S invention; and the invention consists in combining with the casing of the gun and the lever or levers by which the plug is actuated a guiding mechanism which causes the plug to move in a given line, and thus prevents it from binding, or cutting, or chafing, as will be explained.

The barrel A is open at its rear end, and behind the barrel there is formed an open space or chamber, B, extending back several inches into the stock of the gun. At the rear end of this space or chamber is pivoted, at *a*, a lever, C, the heel of which, as at *b*, is rounded off, so as to fit and turn against the rounded plate *c*. At or about the point *d* on said lever C there is pivoted a toggle-lever, D, and to the front of said toggle-lever is pivoted the breech pin, plug, or piston E. On the lever C are formed shoulders *e e*, and on the casing of the gun are also formed shoulders *f*, against which those *e* shut when the lever is brought down into the position shown in Fig. 1. There is also a catch or lock-piece, *g*, at or near the end of the lever, which locks over or to the projection *h* on the barrel, so that several resisting-points are presented to the recoil of the gun, all of which aid to hold the piston or plug E from flying back.

In the sides of the toggle-lever D (one or both sides) may be formed a curved groove, *i*, into which a stud or pin, 2, (in dotted lines,) in the casing of the gun is passed. The groove is continued on into the lever C, as shown at *i*, so that when the lever is shut down, as in Fig. 1, the pin 2 will be in the slot *i*, but when the lever is in the position shown in Fig. 2 the pin 2 will be at the forward part of the toggle-lever D, so that throughout the entire movement of the toggle-lever D it is guided by this pin and groove, and the lever in turn guides the breech plug or pin E, causing it to fairly and smoothly enter and leave the bore of the gun, and move through the open chamber behind the bore. It is obvious that the groove may be in the casing of the chamber and the pin in the toggle, though preferable as shown in the drawings. The groove is so made as to draw down the breech-plug as it moves backward for the purpose of swabbing out the bore, and to raise it up as it advances to bring it into exact line with the bore, and allow it to enter fairly without chafing or binding.

Having thus fully described the nature and object of this part of JAMES H. MERRILL'S invention, what is claimed under this patent is—

In combination with the lever by which the breech pin or plug is actuated, a guiding mechanism, substantially as described, by which said levers and plugs are controlled in their movements to prevent binding, chafing, or bruising, as set forth.

THE MERRILL PATENT FIRE ARMS
MANUFACTURING COMPANY,
By JAMES H. MERRILL,
*Their President.*

Witnesses:
JOHN M. FRIEDRICH,
MAJ. T. SPARKS.